(12) United States Patent
Kobayashi et al.

(10) Patent No.: US 8,356,339 B2
(45) Date of Patent: Jan. 15, 2013

(54) DEVICE CONTROLLER, SYSTEM, AND METHOD FOR AUTHENTICATED PRINTING

(75) Inventors: Reiji Kobayashi, Matsumoto (JP); Shinya Taniguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 690 days.

(21) Appl. No.: 12/359,956

(22) Filed: Jan. 26, 2009

(65) Prior Publication Data
US 2009/0193504 A1 Jul. 30, 2009

(30) Foreign Application Priority Data

Jan. 28, 2008 (JP) ................................. 2008-016282
Dec. 19, 2008 (JP) ................................. 2008-323205

(51) Int. Cl.
*G06F 7/04* (2006.01)
*G06F 21/00* (2006.01)
(52) U.S. Cl. .......................................... 726/4; 713/182
(58) Field of Classification Search .................. None
See application file for complete search history.

(56) References Cited

U.S. PATENT DOCUMENTS

| 8,108,925 | B2* | 1/2012 | Go .................................. 726/17 |
| 2004/0145767 | A1* | 7/2004 | Endo et al. .................... 358/1.13 |
| 2005/0097232 | A1* | 5/2005 | Sasaki et al. ........................ 710/8 |
| 2005/0265744 | A1* | 12/2005 | Uruta .............................. 399/80 |
| 2006/0200704 | A1* | 9/2006 | Takahashi et al. .............. 714/38 |
| 2007/0081186 | A1* | 4/2007 | Numata ........................ 358/1.15 |
| 2007/0124800 | A1* | 5/2007 | Kadota ............................. 726/2 |
| 2009/0080022 | A1* | 3/2009 | Tsutsumi ..................... 358/1.15 |

FOREIGN PATENT DOCUMENTS

| JP | 11-146118 | 5/1999 |
| JP | 2005-129007 | 5/2005 |
| JP | 2005-259012 | 9/2005 |
| JP | 2006-011834 | 1/2006 |
| JP | 2006-085615 | 3/2006 |
| JP | 2006-260023 | 9/2006 |
| JP | 2006-011834 | * 12/2006 |
| JP | 2007-034493 | 2/2007 |

* cited by examiner

*Primary Examiner* — Nathan Flynn
*Assistant Examiner* — Abdullah Almamun
(74) *Attorney, Agent, or Firm* — DLA Piper LLP (US)

(57) ABSTRACT

A device controller is connected with multiple terminals and with at least one input-output device via a network. The device controller has: a reception controller configured to perform first authentication according to data input from a first terminal and to cause the first terminal to obtain information on a specified series of processing based on a result of the first authentication; and an input-output controller configured to perform second authentication according to data input from a second terminal and to cause a specific input-output device selected out of the at least one input-output device to perform the specified series of processing, based on a result of the second authentication. The input-output controller allows the specific input-output device to perform the specified series of processing when the second terminal is selected in advance for the specific input-output device.

9 Claims, 13 Drawing Sheets

SUBROUTINE 1

Fig.6

OPERATION LOG (USER ID: 00351981)

| No. | TIME | IP ADDRESS | VALUE |
|---|---|---|---|
| 01 | 10:23:32 | 10.0.1.11 | 01 |
| 02 | 10:24:53 | 10.0.1.11 | 03 |
| 03 | 10:25:07 | 10.0.1.11 | 02 |
| 04 | 10:25:49 | 10.0.1.36 | 01 |
| 05 | 10:25:51 | 10.0.1.36 | 02 |
| 06 | 10:27:18 | 10.0.1.36 | 01 |

Fig.7

SESSION EVENTS (OBJECTS OF OPERATION LOGS)

| VALUE | MEANING | DETAIL |
|---|---|---|
| 01 | LOGIN | USER'S LOGIN OPERATION |
| 02 | LOGOUT | USER' LOGOUT OPERATION |
| 03 | PRINTING INSTRUCTION | USER'S PRINTING INSTRUCTION OPERATION |
| 04 | INTERRUPTION OF PRINTING | USER'S PRINTING INTERRUPTION OPERATION |
| 05 | COMPLETION OF PRINTING | COMPLETION OF PRINTING |
| 06 | CANCELLATION OF PRINTING | USER'S PRINTING CANCELLATION OPERATION |

Fig.9

SESSION EVENT RULES

| No. | SESSION HISTORY | OPERATION DETAIL | TERMINAL IP ADDRESS | SESSION EVENT |
|---|---|---|---|---|
| 01 | WITHIN 10 MINUTES AFTER PRINTING INSTRUCTION AND SUBSEQUENT LOGOUT | LOG IN BY SAME USER | 10.0.1.36 | START PRINTING WITH PRINTER PRT1 (10.0.1.37) |
| 02 | | | 10.0.1.46 | START PRINTING WITH PRINTER PRT2 (10.0.1.47) |
| 03 | NON-OCCURRENCE OF EVENT 'COMPLETION OF PRINTING' | LOG OUT BY SAME USER | 10.0.1.36 | INTERRUPT PRINTING WITH PRINTER PRT1 (10.0.1.37) |
| 04 | | | 10.0.1.46 | INTERRUPT PRINTING WITH PRINTER PRT2 (10.0.1.47) |

Fig.13

USER MANAGEMENT TABLE

| USER ID | PASSWORD | USER PRIVILEGE | TERM OF VALIDITY | |
|---|---|---|---|---|
| SHI0001 | xxxxxxxx | ADMINISTRATOR | 2009.1.1 | |
| MOI1112 | xxxxxxxx | GENERAL USER | 2009.6.1 | |
| ZAK9876 | xxxxxxxx | GENERAL USER | 2009.6.2 | |
| FAS1423 | xxxxxxxx | ADMINISTRATOR | 2009.6.3 | |
| | | | | |

Fig.15

TERMINAL MANAGEMENT TABLE

| IP ADDRESS | TYPE | SERVICE LIFE | |
|---|---|---|---|
| 192.168.1.x | AUTHENTICATION PURPOSE | 5 | |
| 192.168.1.y | GENERAL PURPOSE | 3 | |
| 192.168.1.z | GENERAL PURPOSE | 3 | |
| | | | |

DEVICE CONTROLLER, SYSTEM, AND METHOD FOR AUTHENTICATED PRINTING

CROSS-REFERENCE TO RELATED APPLICATION

The present application claims priority from Japanese applications P2008-16282A filed on Jan. 28, 2008 and P2008-323205A filed on Dec. 19, 2008, the contents of which are hereby incorporated by reference into this application.

BACKGROUND

1. Field of the Invention

The present invention relates to network control technique.

2. Description of the Related Art

Implementation of the personal information protection law and tendency of the enhanced internal control increasingly attract attention in management of classified information from companies and organizations. In the case of printing classified information, when a printing device is located away from a terminal currently logged in by a user to give a print instruction, there is a risk that the classified information may be leaked to a third person before the user reaches the location of the printing device. An authenticated printing system has been proposed as a countermeasure against this potential problem to suspend a printing operation after the user's print instruction and allow the printing operation in response to only the user's authentication by the printing device or a printer server related to the printing device (see, for example, Japanese Patent Laid-Open No. 2005-259012).

In this proposed authenticated printing system, however, there is relatively heavy management load for smooth operations of the printer server and the printing device performing authentication. For example, in a corporate user having multiple bases, there may be only one authorized system administrator. In the event of failure of a printer server installed at a base without the system administrator, the system administrator should go to the base with the failed printer server for fixation. Such a problem is not characteristic of the printing process but is commonly found in similar processes, for example, a process of writing information into an information recording medium.

SUMMARY

In order to solve the problem of the prior art explained above, there would be a demand for enabling easy but effective authentication output in a system configured to implement a specified series of processing via a network. The present invention accomplishes at least part of the demands mentioned above and the other relevant demands by the following configurations applied to the device controller, the system, and the method.

According to one aspect, the present invention is directed to a device controller connecting with multiple terminals and with at least one input-output device via a network. The device controller has: a reception controller configured to perform first authentication according to data input from a first terminal, which is one of the multiple terminals, and to cause the first terminal to obtain information on a specified series of processing based on a result of the first authentication; and an input-output controller configured to perform second authentication according to data input from a second terminal, which is one of the multiple terminals, and to cause a specific input-output device selected out of the at least one input-output device to perform the specified series of processing, based on a result of the second authentication. The second authentication includes verification that a user as a subject of the second authentication is identical with a user as a subject of the first authentication. The input-output controller allows the specific input-output device to perform the specified series of processing when the second terminal is selected in advance for the specific input-output device.

The device controller according to this aspect of the invention performs authentication, based on data input from one of multiple terminals connecting with the device controller via the network. When the terminal used for the authentication is selected in advance for the specific input-output device, the device controller allows the specific input-output device to perform the specified series of processing. Simple advanced selection of one terminal for the specific input-output device allows execution of the specified series of processing by the specific input-output device. This arrangement does not need any specific server dedicated for authentication but uses any arbitrary server for authentication, thus effectively relieving the management load. Most part of control is performed by the server, while a client terminal logged in by the user is used for required minimum processing. The technique of the invention is thus readily applicable to a thin client system having a specific system architecture of concentrating most part of processing to servers.

In one preferable embodiment of the invention, the device controller further has an operation log recorder configured to record at least part of operations performed by the user as the subject of the second authentication prior to the second authentication, as an operation log of the user. The input-output controller refers to the record of the operation log of the user and allows the specific input-output device to perform the specified series of processing in response to the second authentication within a preset first time period since an instruction given for performing the specified series of processing, while deleting the information on the specified series of processing in the event of no second authentication within a preset second time period since the instruction given for performing the specified series of processing.

This arrangement effectively reduces the risk that classified information is accumulated in a server and is illegally accessed by a third person.

In one preferable application of the device controller of this embodiment, the operation log recorder records a series of operations by each user as an operation log of the user, and the input-output controller changes a setting for the specified series of processing based on the record of the operation log of each user.

This arrangement allows the setting for the specified series of processing to be changed with regard to each user, thus ensuring a finely adjusted response to each user.

In one preferable application of the device controller according to the above aspect of the invention, the input-output controller verifies that the second terminal used for the second authentication is a terminal selected in advance for the specific input-output device, based on address information of the second terminal.

This arrangement ensures application of the invention to a thin client system where all terminals are regarded equivalently. The address information represents an address used for identification of the terminal in the network, for example, a MAC address or an IP address.

In another preferable embodiment of the invention, the device controller further has a user attribute manager configured to manage at least a user attribute representing a user privilege with regard to a user logging into the second terminal for the second authentication. The input-output controller allows the specific input-output device to perform the specified series of processing in a range of limitation based on the user attribute.

The device controller of this embodiment manages at least the user attribute representing the user privilege with regard to each user. The input-output controller allows the specific input-output device to perform the specified series of processing in the range of limitation based on the user attribute. This arrangement effectively prevents execution of any processing beyond the user privilege.

In one preferable application of the device controller of this embodiment, the input-output controller identifies the user attribute of the user logging into the second terminal for the second authentication and, when the identified user attributes represents an administrator privilege, allows the user logging into the second terminal for the second authentication to change at least either a terminal attribute determining a function of at least one of the multiple terminals or the user attribute of the user logging into the second terminal.

When the user attribute of the user logging into the second terminal represents the administrator privilege, the device controller of this application allows the user to change at least one of the terminal attribute determining the function of a terminal and the user attribute of the user. When the user having the administrator privilege logs into the second terminal and is authenticated, the terminal attribute determining the function of the terminal is changeable between an attribute of a terminal with authentication function and an attribute of a terminal without authentication function. Similarly the user attribute of the user under management is changeable between an attribute representing the administrator privilege and an attribute representing the general user privilege. This arrangement ensures flexible and safe management of the terminal attribute and the user attribute.

In another preferable application of the device controller according to the above aspect of the invention, the second authentication includes authentication of a certain user who has permission given by the user as the subject of the second authentication for output as a result of the specified series of processing.

The device controller of this application gives permission for output to a certain user, thus ensuring flexible service of authenticated printing.

The specified series of processing may include output to an information recording medium.

The information recording medium is, for example, a printing medium with information printed thereon.

The device controller of the invention enables information to be output to the information recording medium on the condition of successful authentication, thus desirably improving the reliability.

The technique of the invention is not restricted to the device controller having any of the arrangements discussed above but is also actualized by diversity of other applications, for example, a device control method, a system for output to an information recording medium, or a computer program product.

BRIEF DESCRIPTION OF THE DRAWINGS

FIG. 6 shows one example of an operation log;

FIG. 7 is a table showing session events as objects of operation logs;

FIG. 9 is a table showing one example of session event rules;

FIG. 13 shows one example of a user management table;

FIG. 15 shows one example of a terminal management table.

Some modes of carrying out the invention are described below as preferred embodiments with reference to the accompanied drawings.

DESCRIPTION OF THE PREFERRED EMBODIMENTS

A. First Embodiment
A-1. Schematic Configuration of Printing System

Figure 1:
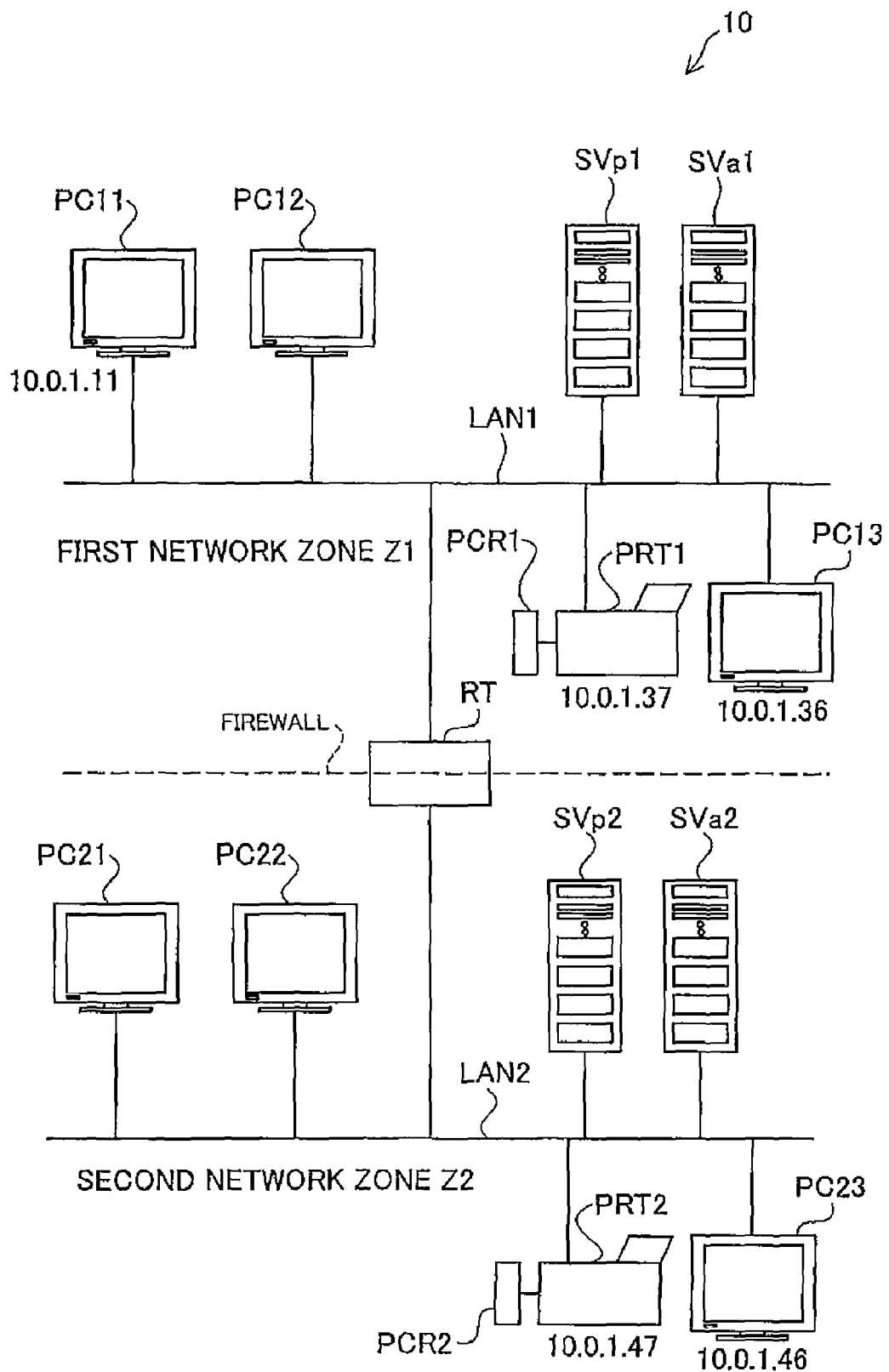
FIG. 1 schematically illustrates the configuration of an authenticated printing system 10 in a first embodiment of the invention.

FIG. 1 schematically illustrates the configuration of an authenticated printing system 10 in a first embodiment of the invention. The authenticated printing system 10 includes a first network zone Z1 connected by means of a local area network LAN1, a second network zone Z2 connected by means of a local area network LAN2, and a router RT arranged to interconnect the two network zones Z1 and Z2 across a firewall.

In the first network zone Z1, three terminals PC11, PC12, PC13, one printer PRT1, one printer server SVp1, and one authentication server SVa1 are mutually connected by the local area network LAN1. In the second network zone Z2, three terminals PC21, PC22, and PC23, one printer PRT2, one printer server SVp2, and one authentication server SVa2 are mutually connected by the local area network LAN2. Magnetic card readers PCR1 and PCR2 for authentication are respectively connected to the printers PRT1 and PRT2.

Figure 2:
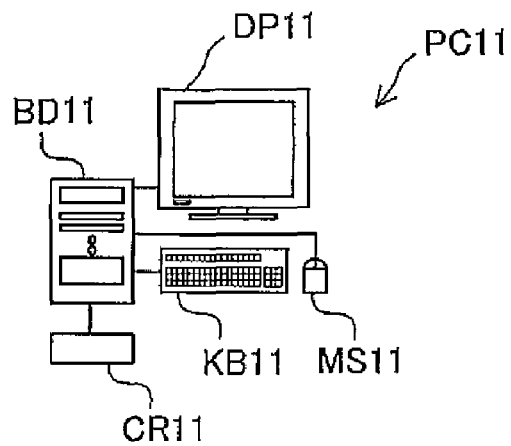
FIG. 2 shows the schematic structure of a terminal PC11 included in the authenticated printing system 10 of FIG. 1.

FIG. 2 shows the schematic structure of the terminal PC11 included in the authenticated printing system 10 of FIG. 1. The terminal PC11 includes a display DP11, a main body BD11, a keyboard KB11, a mouse MS11, and a card reader CR11. The other five terminal PC12, PC13, PC21, PC22, and PC23 have the same structures as that of the terminal PC11 in the embodiment.

Figure 3:
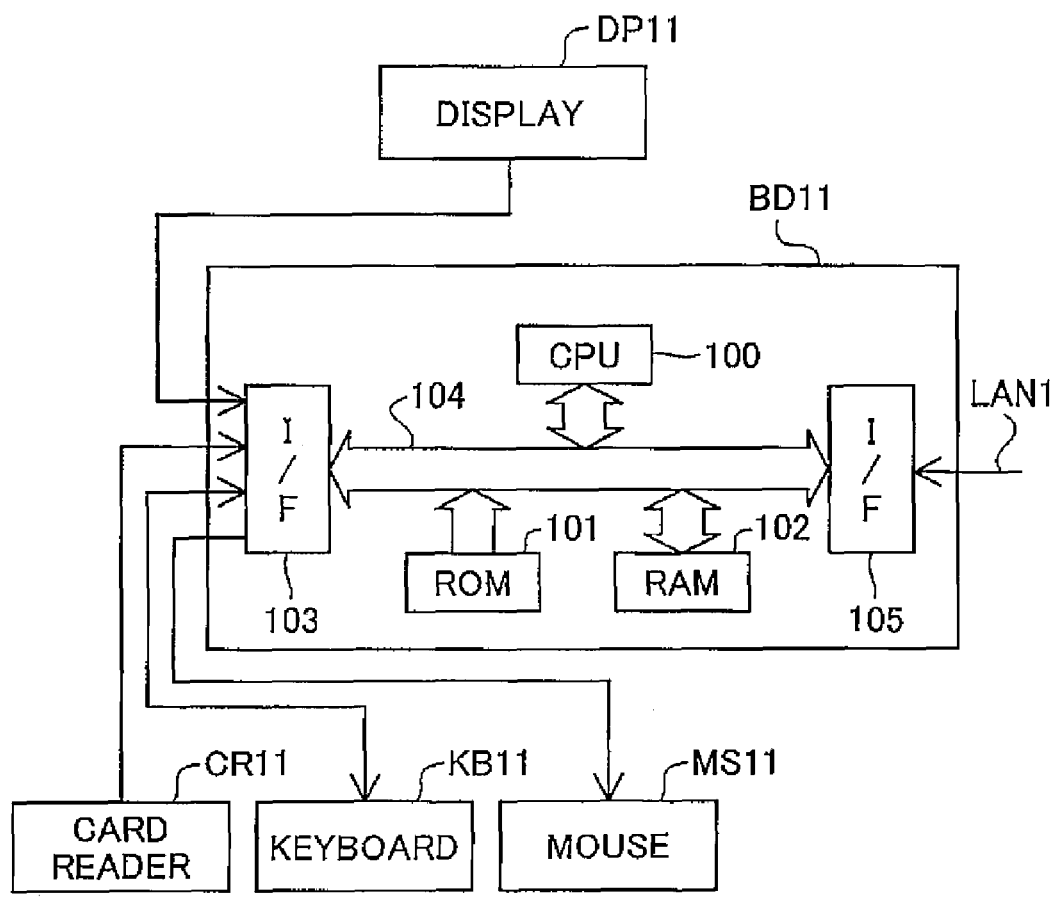
FIG. 3 is a functional block diagram of the terminal PC11 in the embodiment.

FIG. 3 is a functional block diagram of the terminal PC11 in the embodiment. The main body BD11 has a CPU 100 and memories ROM and RAM. The CPU 100 and the memories ROM and RAM are connected to the display DP11, the keyboard KB11, the mouse MS11, and the card reader CR11 via an interface circuit 103 and an internal bus 104. The internal bus 104 is also connected to the local area network LAN1 via an interface circuit 105.

The terminal PC11 of the embodiment is constructed as a thin client terminal without a hard disk or any other non-volatile storage medium. The thin client terminal has only the restricted functions, that is, the function of connecting with the local area network LAN1 and the user interface function, and causes the server to perform required series of data processing. The other terminals PC12, PC13, PC21, PC22, and PC23 are similarly constructed as thin client terminals. The authenticated printing system 10 is thus configured as a thin client system including multiple thin client terminals.

In the thin client system, the terminal PC11 is not required to make direct connection with an external storage device for data input and data output. Disabling the hardware connection for data input and output advantageously protects the thin client system from virus infection and leakage of classified information. Programs (including an operating system) to be executed by the terminal PC11 are directly downloaded from the server onto the main memory of the terminal PC11 according to the requirements. The system manager is accordingly required to manage only the servers. Another advantage of the thin client system is thus significant reduction of management load of the system manager. In this embodiment, programs to be executed by the terminals PC11 and PC12 are under management of the authentication server SVa1, while programs to be executed by the terminals PC21 and PC22 are under management of the authentication server SVa2. In one modification, a dedicated server separate from the authentication servers SVa1 and SVa2 may be provided for network booting and downloading programs.

A-2. Authenticated Printing Process in First Embodiment

Figure 4:
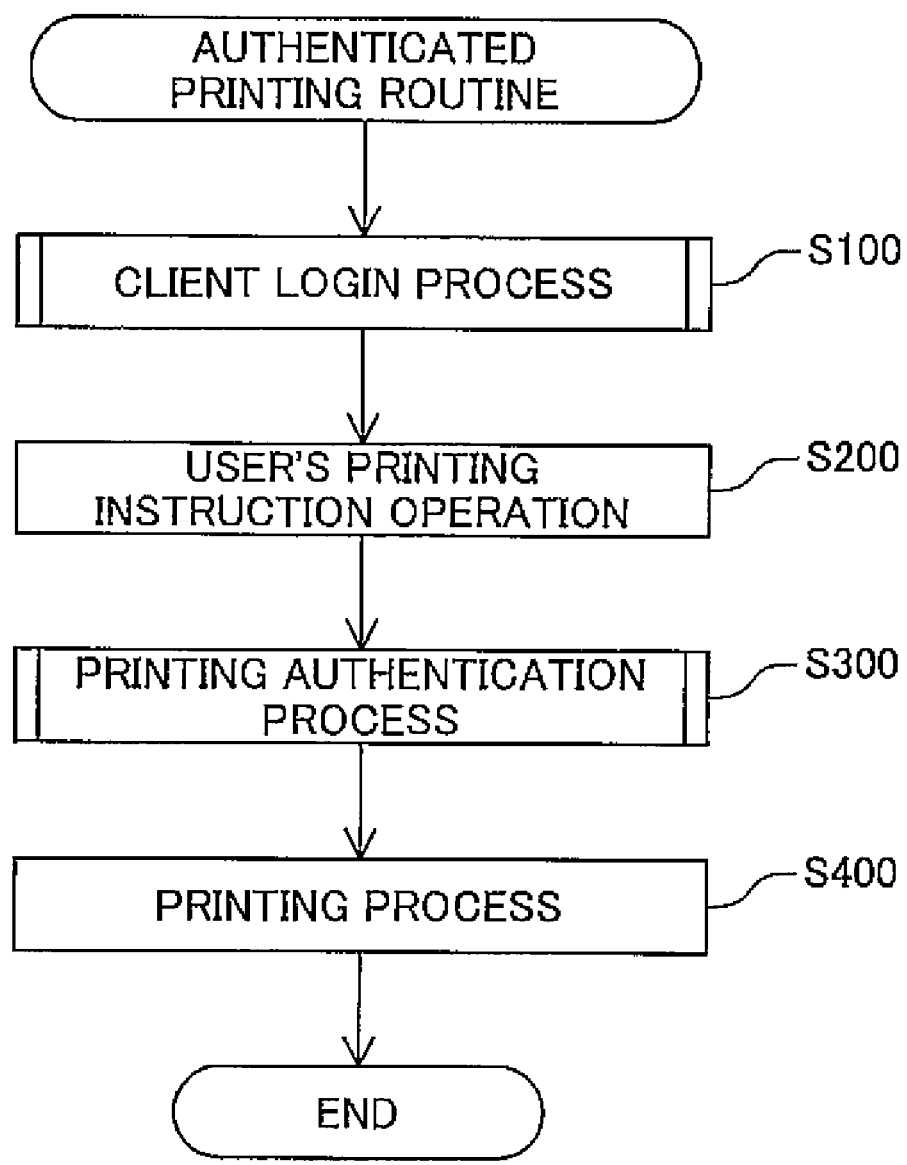
FIG. 4 is a flowchart showing an authenticated printing routine in the first embodiment of the invention.

FIG. 4 is a flowchart showing an authenticated printing routine in the first embodiment of the invention. At step S100, the authenticated printing system 10 performs a client login process in response to the user's entry from the terminal PC11. The client login process causes the authentication server SVa1 to authenticate the user having permission to log into the system, and specifies the details of processing to be executed by the servers SVp1 and SVa1 for the authenticated user.

The client login process of the embodiment is equivalent to the 'first authentication' in the claims of the invention. The authentication server SVa1 functions as the 'receiving controller' in the claims of the invention. The processing programs to be executed by the terminal PC11 are loaded from the authentication server SVa1 by network booting as mentioned previously.

Figure 5:
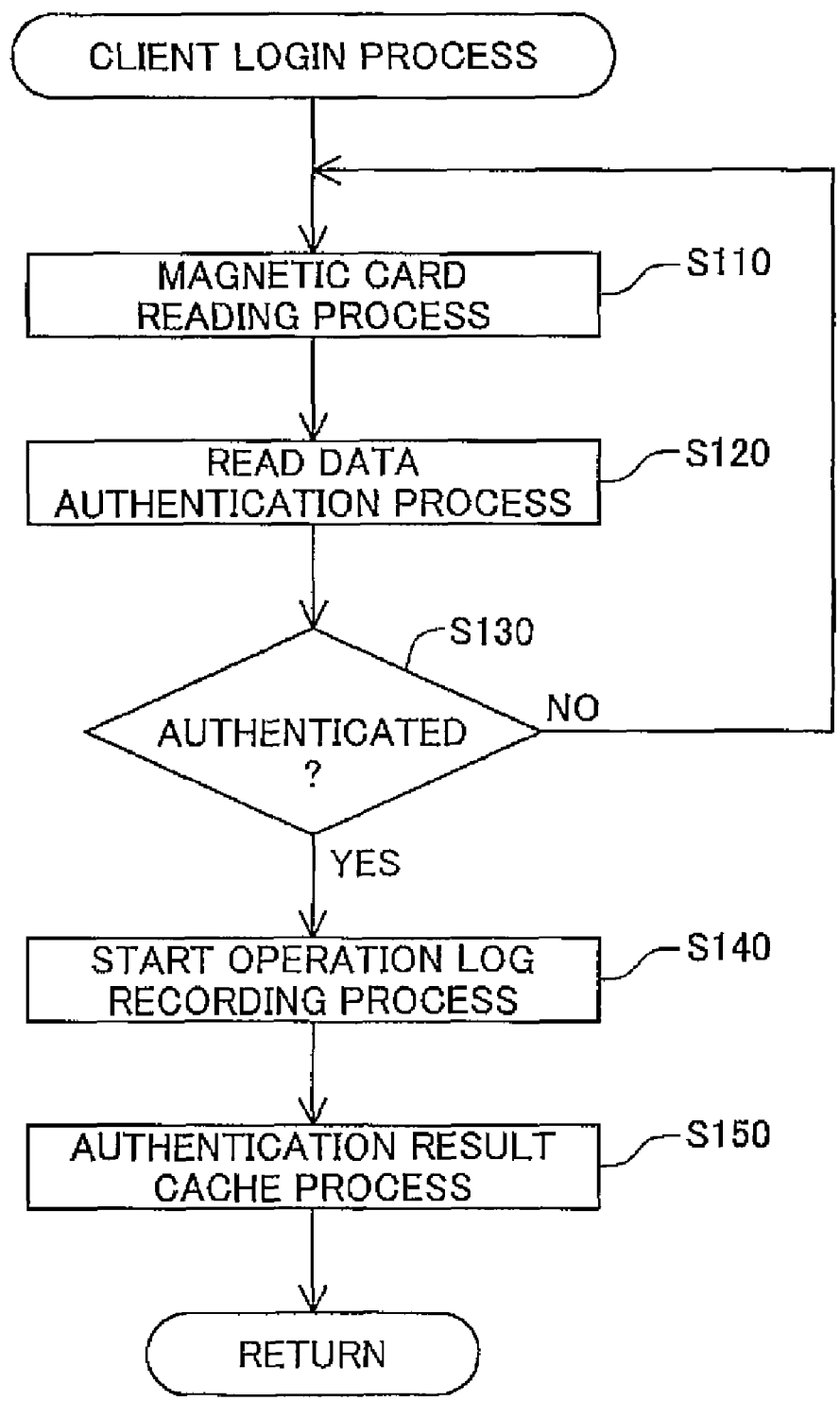
FIG. 5 is a flowchart showing the details of a client login process at step S100 in the authenticated printing routine of FIG. 4.

FIG. 5 is a flowchart showing the details of the client login process at step S100 in the authenticated printing routine of FIG. 4. At step S110, the authenticated printing system 10 performs a magnetic card reading process. The magnetic card reading process reads data from a magnetic card (not shown) that is swiped through the card reader CR11 by the user. In this embodiment, a user ID for identifying the user is read as the data from the magnetic card.

At step S120, the authenticated printing system 10 performs a read data authentication process. The read data authentication process authenticates the user with the user ID read from the magnetic card and a password entered through the user's operation of the keyboard KB11. The processing flow goes to step S140 in response to matching of the read user ID and the entered password with pre-registered data, but goes back to step S110 in the event of mismatching (step S130).

At step S140, the authenticated printing system 10 starts an operation log recording process. The operation log recording process records the user's entries of preset operations in time series among the user's various operations input into the terminal PC11.

At step S150, the authenticated printing system 10 performs an authentication result cache process and returns the processing flow to step S200 in the authenticated printing routine of FIG. 4. The authentication result cache process causes the authentication server SVa1 performing authentication to send authentication result information representing the authentication result to the authentication server SVa2 and the two printers PRT1 and PRT1. This authentication result cache process is not essential for the present invention.

FIG. 6 is a table showing one example of an operation log in the embodiment of the invention. The operation log is recorded with regard to each user ID in the authentication server SVa1. The example of FIG. 6 shows an operation log with regard to the user having a user ID=00351981. The operation log is constructed as a database having multiple records arranged in time series and includes several items 'time of operation', 'IP address of device as operation subject', and 'value representing operation detail'.

FIG. 7 is a table showing session events as objects of operation logs in the embodiment of the invention. The value '01' as the "value representing operation detail' represents completion of a 'login operation'. In the example of FIG. 6, a login operation to the terminal PC11 having the IP address '10.0.1.11' by the user having the user ID=00351981 is completed at 10:23:32. This user's login operation to the terminal PC11 starts recording the operation log shown in FIG. 6. According to the operation log of FIG. 6, the user operates the terminal PC11 to give a printout instruction at 10:24:53 and logs out from the terminal PC11 at 10:25:07. In this embodiment, only the operations corresponding to the session events included in the table of FIG. 7 are recorded as the operation log.

Referring back to the authenticated printing routine of FIG. 4, at step S200, the user operates the terminal PC11 and performs a printing instruction operation. The printing instruction operation gives a printout instruction to the printer PRT1 or to the printer PRT2. This printing instruction operation is one object of the operation log recording process (see FIG. 7). In response to the user's printing instruction operation, the authentication server SVa1 spools a print job (not shown) onto the printer server SVp1. On completion of the printing instruction operation, the user logs out from the terminal PC11 and moves to the terminal PC 13 provided for and located near to the printer PRT1.

In response to the user's logout from the terminal PC11, the authentication server SVa1 may send log information representing an operation log up to the logout from the terminal PC11 to the authentication server SVa2 and the two printers PRT1 and PRT2, in addition to storage of the log information in the authentication server SVa1.

At step S300 in the authenticated printing routine of FIG. 4, the authenticated printing system 10 performs a printing authentication process. In general, the printing authentication process causes the printer's side to perform authentication for printing a classified document. More specifically, when there is a distance between the user's operating terminal and a printer, a server related to the printer performs authentication for printing a classified document (Japanese Patent Laid-Open No. 2005-259012). This aims to prevent the classified document from being leaked to any third person before the user giving a printing instruction on the terminal actually reaches the printer. On completion of the printing authentication process, the authenticated printing system 10 performs an actual printing operation at step S400 and terminates the authenticated printing routine of FIG. 4.

Figure 8:
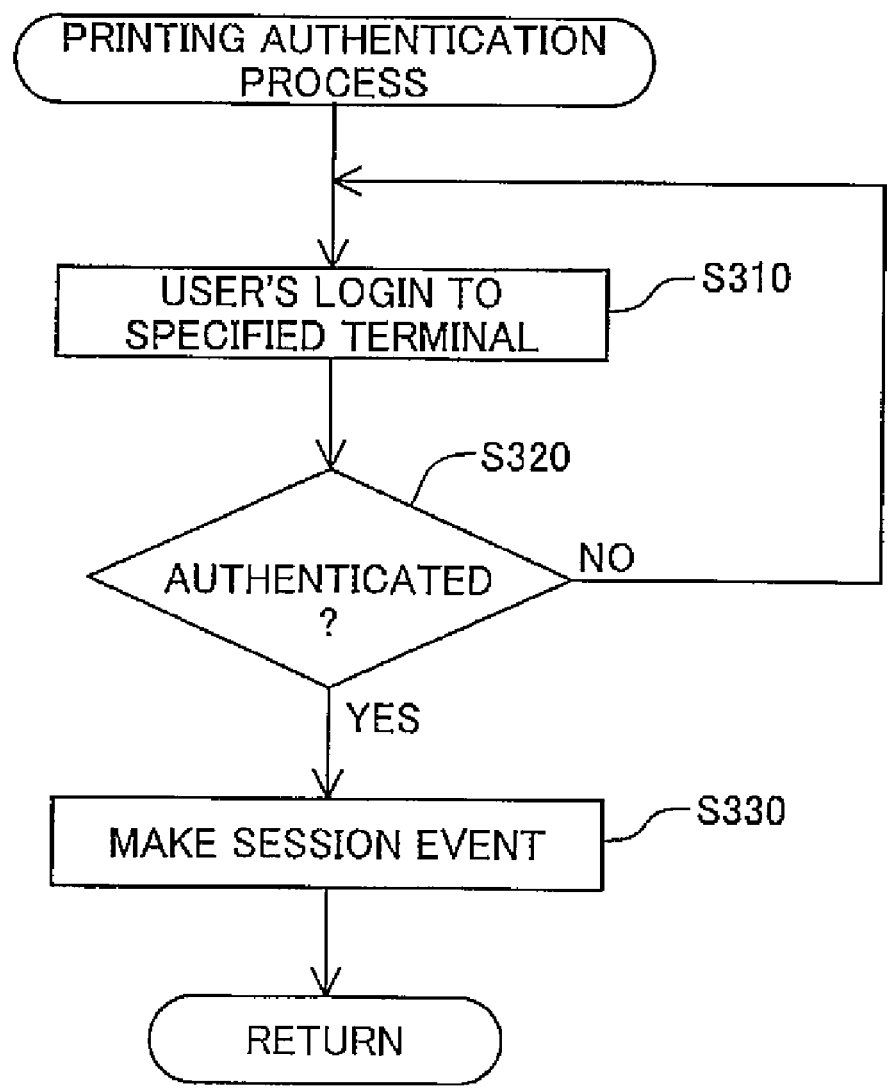
FIG. 8 is a flowchart showing the details of a printing authentication process at step S300 in the authenticated printing routine of FIG. 4.

FIG. 8 is a flowchart showing the details of the printing authentication process at step S300 in the authenticated printing routine of FIG. 4. When the user logs into a specified terminal at step S310, the authentication server SVa1 performs authentication based on the user's entry from the specified terminal at step S320. The specified terminal is selected in advance with regard to each printer The terminal PC13 and the terminal PC23 are respectively selected in advance for the printer PRT1 and for the printer PRT2 (see FIG. 1). For example, when the user logs into the terminal PC13, the authentication server SVa1 performs authentication based on the user's entry from the terminal PC13 and activates the printer PRT1 to perform a printing operation. After the authentication, a corresponding session event is automatically made according to predetermined session event rules (step S330) as discussed below.

FIG. 9 is a table showing one example of session event rules in the embodiment. According to the session event rules, a session event to be automatically made is set in advance, based on a previous 'session history', an 'operation detail', and a 'terminal IP address' of the terminal as the operation subject. For example, when the user having a certain user ID logs into the terminal PC13 having an IP address '10.0.1.36' within 10 minutes after the printing instruction operation and the subsequent logout from the PC11 by the user having the identical IP address, that is, by 10:35:07, the printer PRT1 starts a specified printing operation. In the event of the user's logout from the terminal PC13 prior to the session event 'completion of printing', the printer PRT1 interrupts the specified printing operation.

In response to the user's login to the terminal PC13, the authentication server SVa1 performs the printing authentication process, based on the user's entry from the terminal PC13. The authentication server SVa1 sends a print job (not shown) to the printer PRT1 and causes the printer PRT1 to start the print job according to the session event rules of FIG. 9. In the event of the user's logout from the terminal PC13 prior to the session event 'completion of printing', the server SVa1 causes the printer PRT1 to interrupt the print job according to the session event rules of FIG. 9.

The authenticated printing system 10 of the embodiment can control start and interruption of each printing operation by the user's simple login and logout operations to and from the terminal PC13. This arrangement desirably improves the user's convenience.

The operation details of the operation log (FIG. 6) are recorded with regard to each user in the form of a database and may be customized for each user corresponding to their frequencies and tendencies. For example, as to a certain user who generally checks an output of a print job, changes the settings for printing, and repeats the same print job, a window for setting conditions of reprint may be opened on the terminal PC11.

When some circumstance, for example, system failure or firewall setting, interferes with an access from the terminal PC13 to the authentication server SVa1 or when the authentication server SVa2 controls the terminal PC13 in the thin client system, each print job may be performed according to the cached log information and authentication result information. In the configuration of sending the authentication result information to the two printers PRT1 and PRT2, each print job may be performed by swiping a magnetic card (not shown) through the magnetic card readers PCR1 and PCR2 connecting with the printers PRT1 and PRT2.

B. Second Embodiment

B-1. Authenticated Printing Process in Second Embodiment

Figure 10:
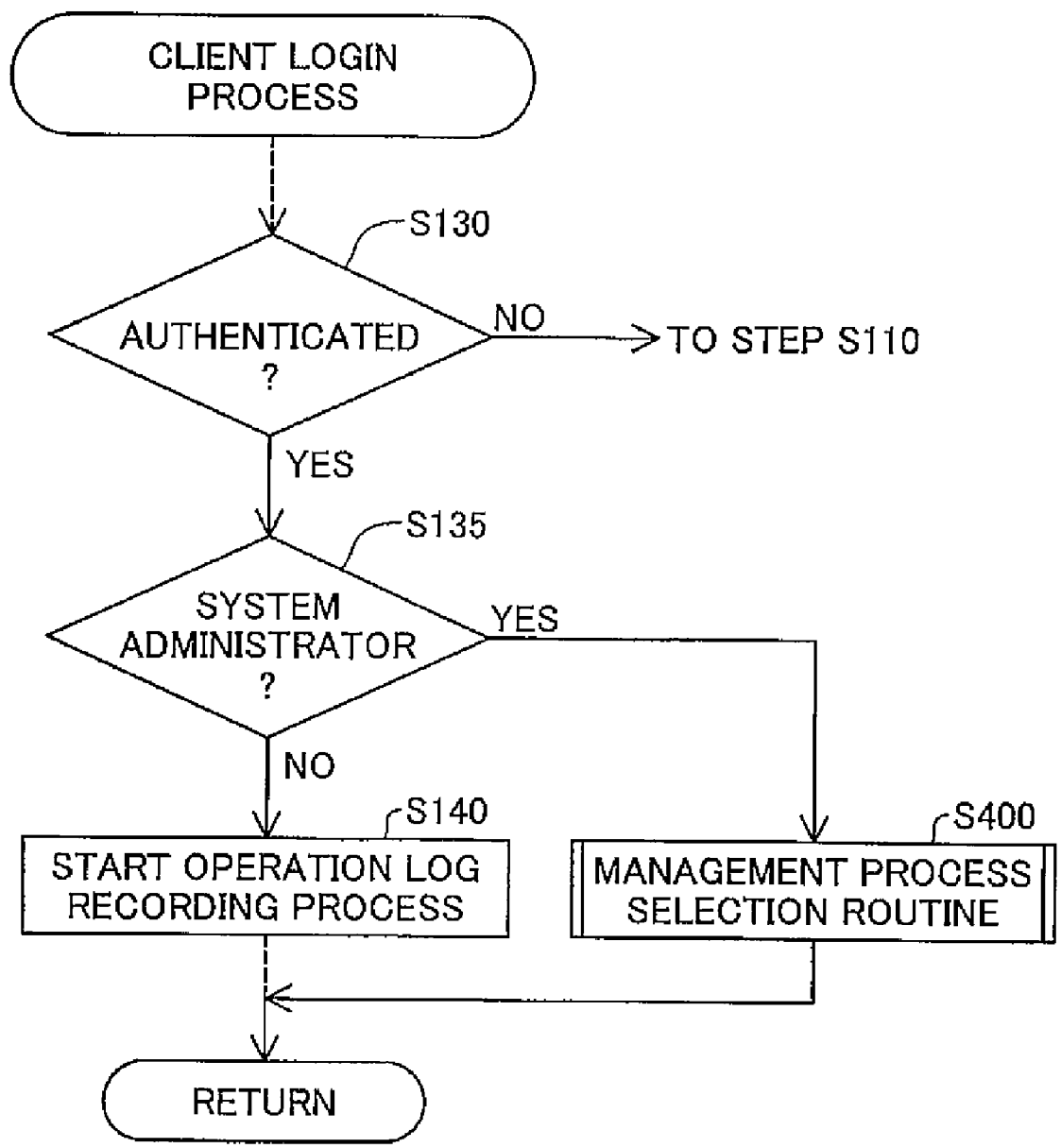
FIG. 10 is a flowchart showing a different flow of the client login process in the authenticated printing routine in a second embodiment of the invention.

An authenticated printing system in a second embodiment of the invention is discussed below. The authenticated printing system of the second embodiment has the same system configuration as that of the authenticated printing system 10 of the first embodiment shown in FIG. 1 but has some difference in part of processing (programs) to be executed. FIG. 10 is a flowchart showing a different flow of the client login process in the authenticated printing routine in the second embodiment of the invention. Only the difference from the client login process of the first embodiment shown in FIG. 5 is discussed below with reference to the flowchart of FIG. 10.

In the case of successful authentication of the user by the authentication server SVa1 based on the user's login operation of the terminal PC11 (the user ID read from the magnetic card and the password entered through the user's operation of the keyboard KB11) at step S130, the client login process of the second embodiment verifies whether the logged-in user is a system administrator (step S135), prior to start of recording the operation log (step S140).

In the system of the second embodiment, information on the logged-in user is registered in advance as user management information in the authentication server SVa1. It is thus verified at step S135 whether the logged-in user is the system administrator by referring to the user management information registered in the authentication server SVa1. When the logged-in user is not authenticated as the system administrator at step S135, the processing flow goes to step S140 to start the operation log recording process and performs the subsequent step in the same manner as the client login operation of the first embodiment. When the logged-in user is not the system administrator, the user cannot perform the series of processing (discussed below) that is permitted for only the system administrator. Namely the operations of the terminal PC11 permitted for the non-administrator user ('general user') are restricted to the general authenticated printing process allowed for the general users.

When the logged-in user is authenticated as the system administrator at step S135, on the other hand, the terminal PC11 executes a management process selection routine (step S400). In the authenticated printing system of the second embodiment constructed as the thin client system, the terminal PC11 loads a required program from the authentication server SVa1. The management process selection routine executed at step S400 in the client login process of FIG. 10 is described in detail with reference to the flowchart of FIG. 11. On activation of the management process selection routine, the terminal PC11 starts a routine of an operation log recording addition process (step S410). The operation log recording addition process reads out a record of the operation log with regard to the authenticated system administrator and adds subsequent operations of the system administrator to the record of the operation log. This process is a memory-resident operation and is performed in the background. In response to each operation of the system administrator, the operation is added to the record of the operation log for the system administrator.

The terminal PC11 subsequently opens a menu on the display DP11 and asks the user authenticated as the system administrator to select a required management process to be executed (step S420). The menu on the display DP11 may include several operations, for example, '1. user attribute change process, 2. terminal attribute change process, 3. others'. In response to the administrator user's entry of a number through the operation of the keyboard KB11, a corresponding management process is activated. The menu may be provided to allow button-based selection with a pointing device or may be provided in any other suitable form, such as voice recognition or cursor-based selection. Especially in the configuration where the user logs in the printer PRT1 instead of the terminal PC11 equipped with the keyboard KB11, the menu is preferably provided in a specific form to allow cursor-based selection or numeric keypad-based selection.

In response to a selection on the displayed menu by the administrator user, the terminal PC11 identifies the selected management process (step S430). Upon identification of the selected management process as a user attribute change process, a user attribute change routine is called (step S440). Upon identification of the selected management process as a terminal attribute change process, on the other hand, a terminal attribute change routine is called (step S470).

Figure 11:
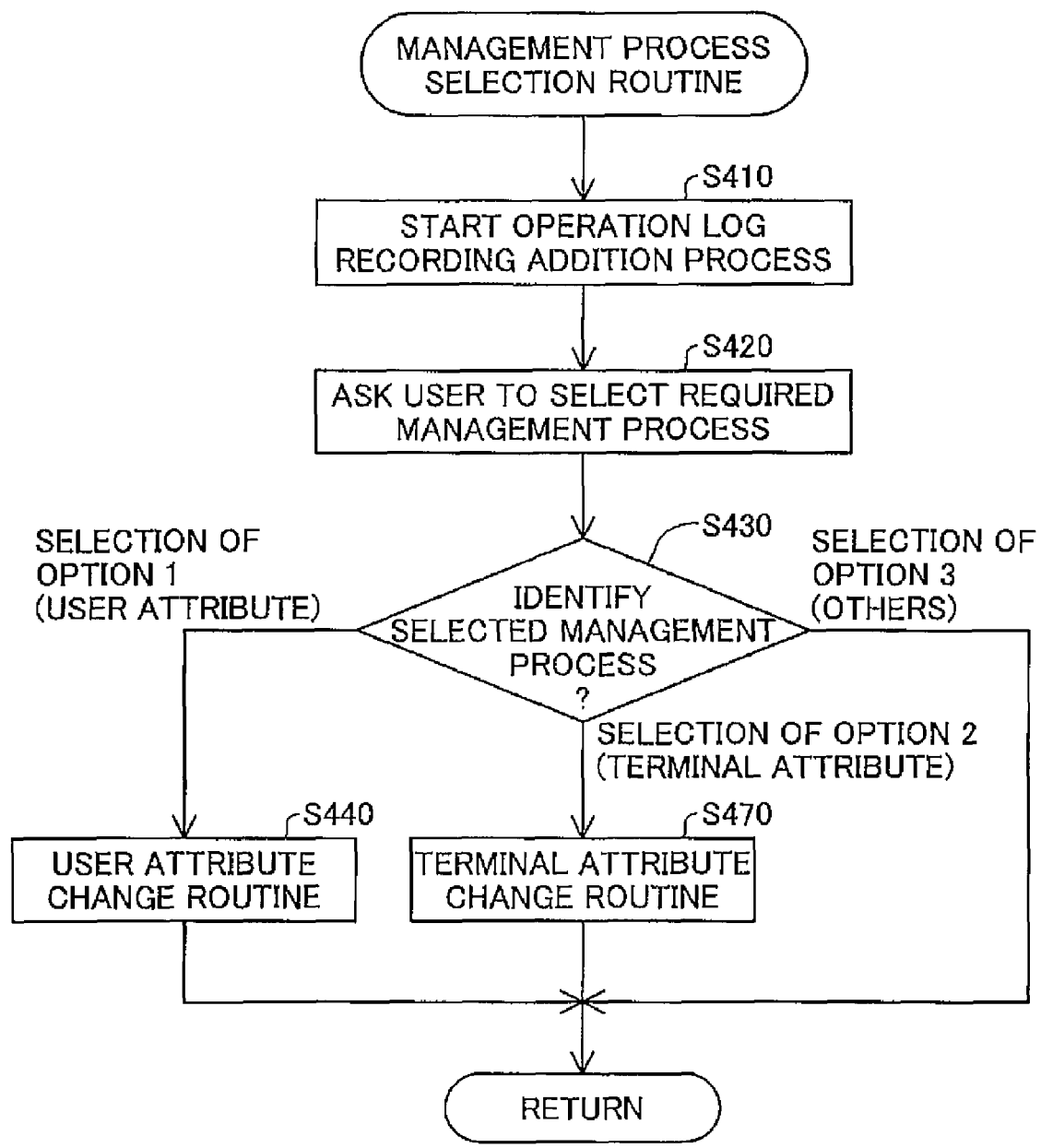
FIG. 11 is a flowchart showing the details of a management process selection routine at step S400 in the client login process of FIG. 10.

The user attribute change routine executed at step S440 in the management process selection routine of FIG. 11 is described in detail with reference to the flowchart of FIG. 12. On the call of the user attribute change routine of FIG. 12 (step S440 in FIG. 11), the terminal PC11 first calls the routine of the operation log recording addition process for registration (step S442) as described above. The terminal PC11 subsequently asks the user authenticated as the system administrator to specify a user as a subject of user attribute change among multiple users having their attributes stored in the authentication server SVa1 (step S444). FIG. 13 shows one example of a user management table under management of the authentication server SVa1. The user management table manages the respective users by their IDs and stores various attributes of each user, for example, a password, user privilege (general user or administrator), and a term of validity. The attributes stored in the user management table are not restricted to this example but may include other various pieces of information, such as sex, age, photograph, term of enrollment, and years of experience. In this embodiment, the user authenticated as the system administrator directly enters a user ID through the operation of the keyboard KB11 to specify the user as the subject of user attribute change. One modification may show a list of user IDs on the display DP11 of the terminal PC11 and allow the system administrator to select a desired user ID with a pointing device.

In response to the administrator user's entry of a user ID as the subject of user attribute change through the operation of the keyboard KB11, the terminal PC11 retrieves the user management table stored in the authentication server SVa1 to obtain user attribute information correlated to the entered user ID (step S446). A modified application may obtain information of the user management table from the authentication server SVa1, show the obtained information of the user management table in the form of a table, and allow the user authenticated as the system administrator to select a desired user as the subject of user attribute change in the table. In this modification, the respective users may be divided into multiple groups by their positions (division, department) or their privileges, and the list of users may be displayed in a hierarchical manner. This arrangement facilitates the administrator user's selection of the desired user as the subject of user attribute change.

After specification of the user as the subject of user attribute change, the terminal PC11 shows an inquiry about requirement for a change of a selected user attribute on the screen of the display DP11 (step S448). In this embodiment, the user attribute selected for a change is user privilege. When the user specified as the subject of user attribute change has the user privilege 'administrator', there is an inquiry about requirement for a change of the user privilege to the 'general user'. When the specified user has the user privilege 'general user', on the contrary, there is an inquiry about requirement for a change of the user privilege to the 'administrator'. The 'administrator' represents a user having the right to change the user attributes and the terminal attributes, and the 'general user' represents a user having no such right. The user privilege may be segmented according to the allowable range of attributes for a change. For example, the 'administrator' may be divided into 'supervisor (senior administrator)' who is allowed to change any attributes including the user name and the user ID and 'junior administrator' who is allowed to change only the user privilege. The 'general user' may be divided into 'valid user' who is allowed to change the user attributes except the user privilege, for example, the user name and the password, and 'temporary user' who is not allowed to change any user attributes.

The terminal PC11 then determines whether the user authenticated as the system administrator gives an attribute change instruction (step S450). In response to the attribute change instruction, the terminal PC11 changes the selected user attribute, that is, the user privilege (step S452). In the case of no attribute change instruction, there is no change of the user privilege. In this embodiment, the user privilege is changed between the 'administrator' and the 'general user' in response to the attribute change instruction. In the case of further segmentation of the user privilege as mentioned above, an interface including radio buttons, for example, may be provided to allow selection of a desired user privilege by the user as the system administrator. In the case where multiple users are specifiable in the user search step (step S446), the user attribute (user privilege) of the specified multiple users may be changed collectively. In the system of dividing the respective users into multiple groups, selection of a certain group is equivalent to simultaneous specification of multiple users. Multiple users may otherwise be specified according to the administrator's entry of multiple search conditions. This arrangement allows collective change of the specified user attribute for the specified multiple users.

This series of processing completes the change of the selected user attribute. The terminal PC11 then shows an inquiry about requirement for a call of the management process selection routine of FIG. 11 to prepare for a subsequent change of another user attribute or a terminal attribute (step S454). In response to the user's requirement (step S460), the terminal PC11 calls the management process selection routine (step S462). In the case of no such requirement (step S460), the user attribute change routine goes to 'End' and is terminated. According to this user attribute change routine, the user authenticated as the system administrator changes the privilege of a user specified by the user ID.

Figure 14:
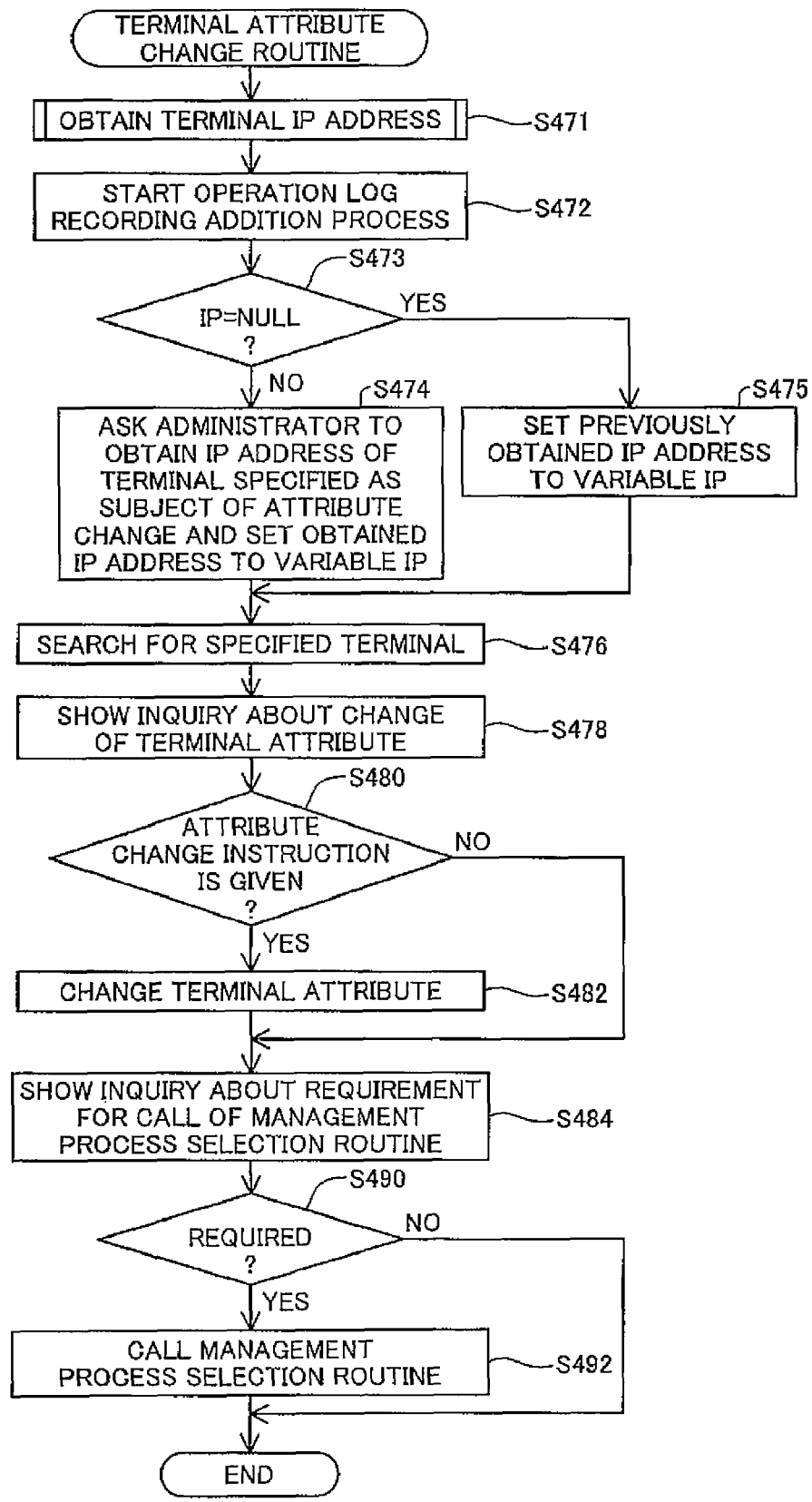
FIG. 14 is a flowchart showing the details of a terminal attribute change routine at step S470 in the management process selection routine of FIG. 11.

The terminal attribute change routine executed at step S470 in the management process selection routine of FIG. 11 is described in detail with reference to the flowchart of FIG. 14. The terminal attribute change routine of FIG. 14 is basically similar to the user attribute change routine of FIG. 12, except the object to be changed is not a user attribute but a terminal attribute. The terminal attribute change routine of FIG. 14 first obtains a terminal IP address (step S471). The terminal IP address obtained here is the IP address of a terminal currently logged in by the user authenticated as the system administrator or the IP address of another terminal specified by the system administrator. The IP address of the terminal PC11 currently logged in by the administrator is readily obtained by a simple call of the IP address. The procedure of the embodiment first obtains and displays the IP address of the terminal PC11 and allows the system administrator to change the displayed terminal IP address to another terminal IP address when necessary. This is because it is highly probable that the system administrator requires a change of the terminal attribute with regard to the terminal currently logged in by the administrator. The system administrator may perform a subsequent series of processing with the obtained IP address of the terminal PC11 or with deletion of the displayed terminal IP address to null.

Figure 12:
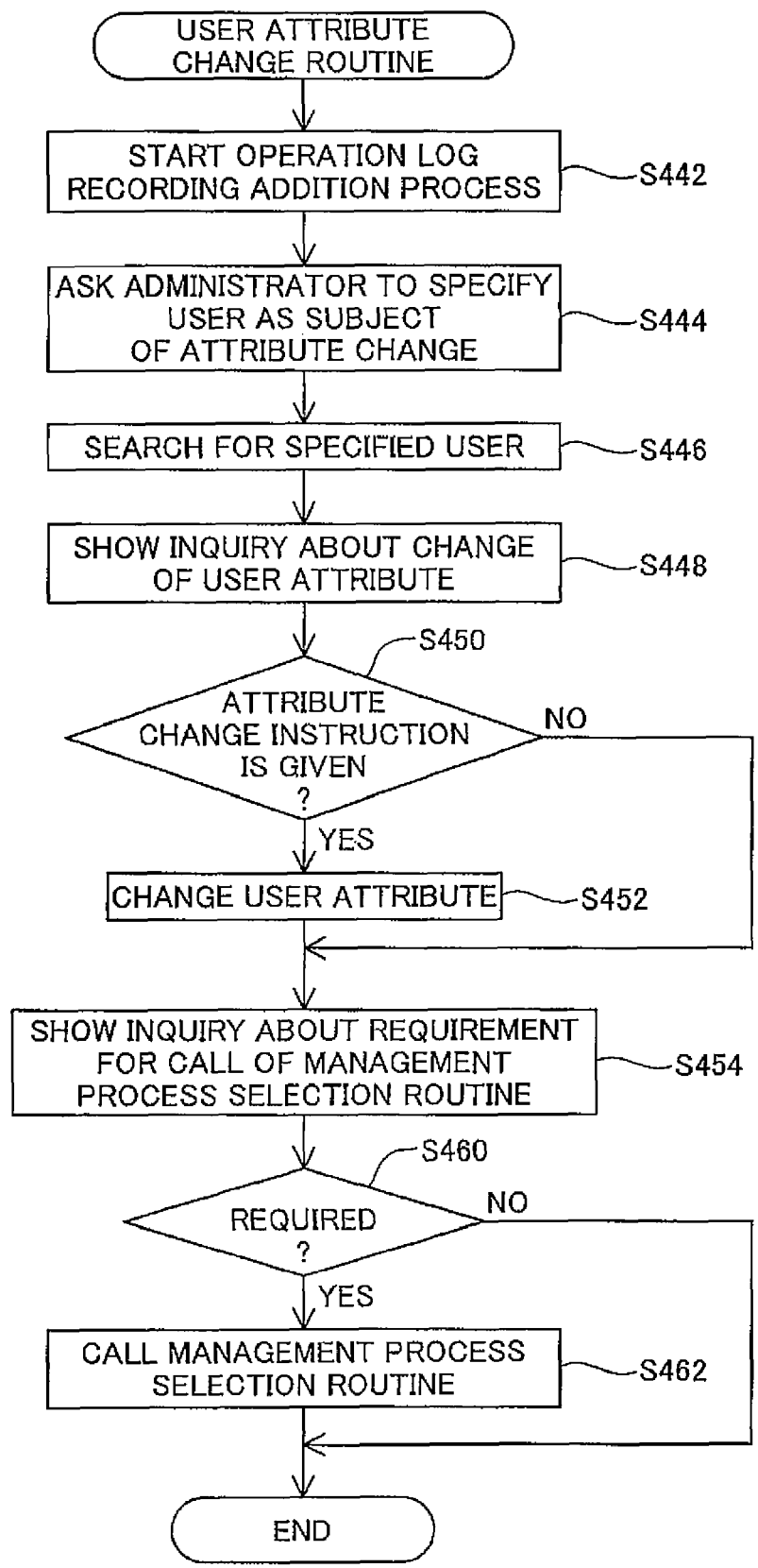
FIG. 12 is a flowchart showing the details of a user attribute change routine at step S440 in the management process selection routine of FIG. 11.

In the same manner as the user attribute change routine of FIG. 12, the terminal attribute change routine of FIG. 14 then calls the routine of the operation log recording addition process for registration (step S472) as described above. It is then determined whether the IP address is null (step S473). When the IP address is null, the terminal PC 11 asks the system administrator to obtain the IP address of a terminal specified as a subject of terminal attribute change and sets the IP address of the specified terminal to a variable IP (step S474). When the IP address is not null, on the other hand, the terminal PC11 sets the previously obtained IP address to the variable IP (step S475). This series of processing records the IP address of the terminal specified as the subject of terminal attribute change into the operation log. In the case where the system administrator specifies the terminal other than the currently logged-in terminal PC11 as the subject of terminal attribute change, the user authenticated as the system administrator directly enters the IP address of the specified terminal in this embodiment. One modification may show a list of terminals as possible subjects of terminal attribute change on the display DP11 of the terminal PC11 and allow the system administrator to select a desired terminal with a pointing device. As in the user attribute change process, the respective terminals may be divided into groups and managed in a hierarchical manner with a view to facilitating specification of a desired terminal. Multiple terminals may be specified simultaneously.

After setting the IP address of the terminal specified as the subject of terminal attribute change to the variable IP, the terminal PC11 retrieves terminals under management of the authentication server SVa1 to obtain terminal attribute information correlated to the set variable IP (step S476). FIG. 15 shows one example of a terminal management table under management of the authentication server SVa1. The terminal management table manages the respective terminals by their IP addresses and stores various attributes of each terminal, for example, type of the terminal (terminal for authentication purpose or terminal for general purpose) and function of terminal. The attributes stored in the terminal management table are not restricted to this example but may include other various pieces of information, such as available time and service life.

After specification of the terminal as the subject of terminal attribute change, the terminal PC11 shows an inquiry about requirement for a change of a selected terminal attribute on the screen of the display DP11 (step S478). In this embodiment, the terminal attribute selected for a change is the type of the terminal. When the type of the terminal specified as the subject of terminal attribute change is the 'terminal for authentication purpose', there is an inquiry about requirement for a change of the type of the terminal to the 'terminal for general purpose'. When the type of the specified terminal is the 'terminal for general purpose', on the contrary, there is an inquiry about requirement for a change of the type of the terminal to the 'terminal for authentication purpose'. The 'terminal for authentication purpose' represents a terminal allowed to perform authentication for permission of printing in the printing authentication process of the first embodiment, and the 'terminal for general purpose' represents a general terminal not allowed to perform such printing authentication.

The type of the terminal may be segmented according to the allowable range of attributes for a change. For example, the 'terminal for authentication purpose' may be divided into 'supervisor (special terminal for authentication purpose)' that is allowed to change settings of all session events including interruption and restart of an input-output operation (printing) and 'general terminal for authentication purpose' that is allowed to change only a start of the input-output operation (printing). The 'terminal for general purpose' may be divided into 'valid terminal' having permission for entry and editing of data but no permission for printing or another authentication and 'reference terminal' (operated by a temporary user) having permission for browsing data but no permission for entry and editing of data.

The terminal PC11 then determines whether the user authenticated as the system administrator gives an attribute change instruction (step S480). In response to the attribute change instruction, the terminal PC11 changes the selected terminal attribute, that is, the type of the terminal (step S482). In the case of no attribute change instruction, there is no change of the type of the terminal. In this embodiment, the type of the terminal is changed between the 'terminal for authentication purpose' and the 'terminal for general purpose' in response to the attribute change instruction. In the case of further segmentation of the type of the terminal as mentioned above, an interface including radio buttons, for example, may be provided to allow selection of a desired terminal type by the user as the system administrator. In the case where multiple terminals are specifiable in the terminal search step (step S476), the terminal attribute (terminal type) of the specified multiple terminals may be changed collectively. Multiple terminals may be readily specifiable in the same manner as the search for multiple users described above. This arrangement allows collective change of the selected terminal attribute for the specified multiple terminals.

This series of processing completes the change of the selected terminal attribute. The terminal PC11 then shows an inquiry about requirement for a call of the management process selection routine of FIG. 11 to prepare for a subsequent change of another terminal attribute or a user attribute (step S484). In response to the user's requirement (step S490), the terminal PC11 calls the management process selection routine (step S492). In the case of no such requirement (step S490), the terminal attribute change routine goes to 'End' and is terminated. According to this terminal attribute change routine, the user authenticated as the system administrator changes the type of a terminal specified by the IP address.

The system of the second embodiment allows the user logging into the terminal as the system administrator to change a selected user attribute or a selected terminal attribute, in addition to authenticated printing as in the first embodiment. The system of the second embodiment, however, prohibits the user logging into the terminal as the non-system administrator from changing the user attribute or the terminal attribute. This arrangement accordingly ensures flexible change of the settings of authenticated printing without damaging the convenience of authenticated printing.

In the description of the above embodiments, the user logs into the terminal PC11 for authenticated printing. This is, however, not restrictive. The user may alternatively log into any of the other terminals PC12, PC13, PC21, PC22, and PC23 and the printers PRT1 and PRT2 for authenticated printing in the first and the second embodiments and their modifications. The user may also log into the server SVp1 or SVp2 or the server SVa1 or SVa2 in a terminal operation mode for authenticated printing.

C. Other Aspects

The embodiments discussed above are to be considered in all aspects as illustrative and not restrictive. There may be many modifications, changes, and alterations without departing from the scope or spirit of the main characteristics of the present invention. The respective elements of the embodiments other than the essential elements disclosed in the independent aspects of the invention are additional and may be omitted when not required. Some examples of possible modification are given below.

C-1. The above embodiments describe the application of the invention to the printing medium with information printed thereon as one form of the information recording medium. The technique of the invention is also applicable to data output to a data recording medium as another form of the information recording medium, for example, a flexible disk, a CD-ROM, or a DVD-ROM.

C-2. The above embodiments describe the thin client system including multiple thin client terminals. The technique of the invention is also applicable to a rich client system. In the thin client system, all the thin client terminals are regarded equivalently but are distinguished by address information, such as a MAC address or an IP address, used for identification in a network in the present invention.

C-3. In the authenticated printing systems of the first and the second embodiments described above, the authentication server performs authentication and printing control, while the printer server is used to spool print job data. These servers may be constructed to have both the functions.

What is claimed is:

1. A device controller connecting with multiple terminals and with at least one input-output device via a network, the device controller comprising:
    a reception controller configured to perform first authentication according to data input from a first terminal, which is one of the multiple terminals, and to cause the first terminal to obtain information on a specified series of processing based on a result of the first authentication;
    an input-output controller configured to perform second authentication according to data input from a second terminal, which is one of the multiple terminals, and to cause a specific input-output device selected out of the at least one input-output device to perform the specified series of processing, based on a result of the second authentication; and
    an operation log recorder configured to record at least part of operations performed by the user as the subject of the second authentication prior to the second authentication, as an operation log of the user, wherein
    the second authentication includes verification that a user as a subject of the second authentication is identical with a user as a subject of the first authentication,
    the input-output controller allows the specific input-output device to perform the specified series of processing when the second terminal is selected in advance for the specific input-output device, and
    the input-output controller refers to the record of the operation log of the user and allows the specific input-output device to perform the specified series of processing in response to the second authentication within a preset first time period since an instruction given for performing the specified series of processing, while deleting the information on the specified series of processing in the event of no second authentication within a preset second time period since the instruction given for performing the specified series of processing.

2. The device controller in accordance with claim 1, wherein the operation log recorder records a series of operations by each user as an operation log of the user, and
    the input-output controller changes a setting for the specified series of processing based on the record of the operation log of each user.

3. The device controller in accordance with claim 1, wherein the input-output controller verifies that the second terminal used for the second authentication is a terminal selected in advance for the specific input-output device, based on address information of the second terminal.

4. The device controller in accordance with claim 1, wherein the input-output controller identifies the user attribute of the user logging into the second terminal for the second authentication and, when the identified user attributes represents an administrator privilege, allows the user logging into the second terminal for the second authentication to change at least either a terminal attribute determining a function of at least one of the multiple terminals or the user attribute of the user logging into the second terminal.

5. The device controller in accordance with claim 1, wherein the second authentication includes authentication of a certain user who has permission given by the user as the subject of the second authentication for output as a result of the specified series of processing.

6. The device controller in accordance with claim 1, wherein the specified series of processing includes output to an information recording medium.

7. The device controller in accordance with claim 6, wherein the information recording medium is a printing medium with information printed thereon.

8. A system configured to implement a specified series of processing via a network, the system comprising:
    multiple terminals connected to the network;
    at least one input-output device connected to the network and arranged to perform the specified series of processing; and
    the device controller in accordance with claim 1.

9. A method of controlling multiple terminals and at least one input-output device via a network, the method comprising:
    a reception control step of performing first authentication according to data input from a first terminal, which is one of the multiple terminals, and causing the first terminal to obtain information on a specified series of processing based on a result of the first authentication;
    an input-output control step of performing second authentication according to data input from a second terminal, which is one of the multiple terminals, and causing a specific input-output device selected out of the at least one input-output device to perform the specified series of processing, based on a result of the second authentication; and
    an operation log recording step of recording at least part of operations performed by the user as the subject of the second authentication prior to the second authentication, as an operation log of the user, wherein
    the second authentication includes verification that a user as a subject of the second authentication is identical with a user as a subject of the first authentication,
    the input-output control step allows the specific input-output device to perform the specified series of processing when the second terminal is selected in advance for the specific input-output device, and
    the input-output control step refers to the record of the operation log of the user and allows the specific input-output device to perform the specified series of processing in response to the second authentication within a preset first time period since an instruction given for performing the specified series of processing, while deleting the information on the specified series of processing in the event of no second authentication within a preset second time period since the instruction given for performing the specified series of processing.

* * * * *